(12) United States Patent  
Scroggie et al.

(10) Patent No.: US 7,954,206 B2  
(45) Date of Patent: Jun. 7, 2011

(54) PIN AND GROMMET FASTENER ASSEMBLY

(75) Inventors: Derek Scroggie, Macomb, MI (US); Robert Osterland, East China, MI (US); Aaron Jagoda, Richmond, MI (US)

(73) Assignee: Illinois Tool Works Inc., Glenview, IL (US)

( * ) Notice: Subject to any disclaimer, the term of this patent is extended or adjusted under 35 U.S.C. 154(b) by 734 days.

(21) Appl. No.: 12/016,493

(22) Filed: Jan. 18, 2008

(65) Prior Publication Data

US 2008/0260488 A1 Oct. 23, 2008

Related U.S. Application Data (60) Provisional application No. 60/925,218, filed on Apr. 19, 2007.

(51) Int. Cl.  
*A44B 99/00* (2010.01)  
*F16B 19/00* (2006.01)

(52) U.S. Cl. .............................. 24/297; 24/453; 411/509
(58) Field of Classification Search .................. None
See application file for complete search history.

(56) References Cited

U.S. PATENT DOCUMENTS

| 6,457,217 | B2 * | 10/2002 | Yoshii et al. ................. 24/297 |
| 2004/0049895 | A1 * | 3/2004 | Draggoo et al. .............. 24/297 |
| 2007/0186389 | A1 * | 8/2007 | Smith et al. .................. 24/297 |

* cited by examiner

*Primary Examiner* — Jack W. Lavinder  
(74) *Attorney, Agent, or Firm* — Mark W. Croll; Paul F. Donovan (57) ABSTRACT

A fastener assembly configured to secure a first panel to a second panel includes a pin and a grommet. The pin includes a shaft connected to a tip. The grommet is configured to snapably secure into a hole of a panel. The grommet includes a central passage. The shaft is adjustably secured within the central passage, such that the shaft is allowed to shift a fixed distance within the central passage in a first direction, but is locked in place in the central passage with respect to a second direction that is perpendicular to the first direction.

16 Claims, 9 Drawing Sheets

PIN AND GROMMET FASTENER ASSEMBLY

RELATED APPLICATIONS

This application relates to and claims priority benefits from U.S. Provisional Patent Application No. 60/925,218 entitled "Pin and Grommet Fastener Assembly," filed Apr. 19, 2007, which is hereby incorporated by reference in its entirety.

FIELD OF THE INVENTION

Embodiments of the present invention generally relate to a fastener assembly, and more particularly to a pin and grommet fastener assembly configured to secure panels together.

BACKGROUND OF THE INVENTION

Various applications include a first panel secured to a second panel. For example, cover panels, such as B-pillar appliqués, may be secured to automobiles include door frames or panels.

In order to secure the appliqué to the door panel, a pin and grommet fastener may be used. The fastener typically includes a pin secured within a grommet. A top, planar portion of the pin may be adhesively secured to the appliqué, while the grommet is snapably secured within a hole formed in the door frame. Typically, the grommet includes a hole that allows the pin to pass through during a mating process. The hole typically conforms to the shape of the pin shaft when the pin is secured with respect to the grommet. As such, the pin is not allowed to shift with respect to the grommet.

During the assembly process, however, the pin may need to be adjusted with respect to the grommet in order to properly align and secure the appliqué with respect to the door frame. Because the pin is securely retained within the grommet, an adjustable feature may be formed on the panel(s), such as with respect to a slot of one of the panels, in order to allow for adjustment of the pin and grommet. Separate tooling and additional labor is typically needed to form the adjustable feature. Consequently, forming the separate adjustable features add labor time and costs.

SUMMARY OF THE INVENTION

Certain embodiments of the present invention provide a fastener assembly configured to secure a first panel to a second panel. The fastener assembly includes a pin and a grommet. The pin includes a shaft connected to a tip. The grommet is configured to snapably secure into a hole of a panel. The grommet includes a central passage. The shaft is adjustably secured within the central passage, such that the shaft is allowed to shift a fixed distance within the central passage in a first direction, but is locked in place in the central passage with respect to a second direction that may be perpendicular to the first direction. Optionally, the grommet may be configured to allow the shaft to shift through numerous directions.

Certain embodiments of the present invention provide a fastener that includes a pin and a W-shaped grommet configured to snapably secure into a hole of a panel. The pin includes a mounting member, such as a collar having, or connected to, a mounting surface, which is in turn connected to a shaft. The shaft is, in turn, connected to an expanded tip. The mounting member is configured to secure to another panel.

The W-shaped grommet is configured to snapably secure into a hole of the panel and includes walls connected to opposing flexible wings. A central passage is formed through the grommet. The shaft is adjustably secured within the central passage, wherein the shaft is allowed to shift within the central passage.

Certain embodiments of the present invention provide a fastener assembly configured to secure a first panel, such as a B-pillar appliqué, to a second panel, such as a vehicle door panel. The fastener assembly includes a pin and a W-shaped grommet.

The pin may include a mounting member connected to a shaft, which is in turn connected to an expanded tip. The mounting member may be configured to secure to the first panel through an adhesive. The mounting member may include a collar connected to the shaft and an angled mounting surface connected to the collar through a wedge.

The W-shaped grommet is configured to snapably secure into a hole of the second panel and may include walls connected to opposing flexible wings, wherein a central passage is formed through the grommet. The grommet may also include two sets of opposing ribs extending into the central passage. The shaft of the pin is adjustably secured within the central passage such that it is allowed to shift within the central passage in a first direction. However, the shaft may be locked in place in the central passage with respect to a second direction that may be perpendicular to the first direction. The two sets of opposing ribs limit movement of the shaft within the central passage. The pin may be manipulated, however, to force the shaft past a particular set of opposing ribs.

The opposing flexible wings may flex toward one another when the grommet is snapably secured into the hole of the second panel. The opposing flexible wings prevent the walls that define the central passage from outwardly bowing (thereby expanding the central passage in one direction) when the grommet is snapably secured into the hole of the second panel.

The grommet may also include locating protuberances that are configured to locate and align the grommet with respect to the hole of the second panel. The locating protuberances may also provide barriers that prevent the opposing flexible wings from over-flexing when the grommet is secured in the hole.

The tip of the pin may include first ledges and the grommet may include second ledges bounding the central passage. The first ledges may be slidably secured on the second ledges.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 1:
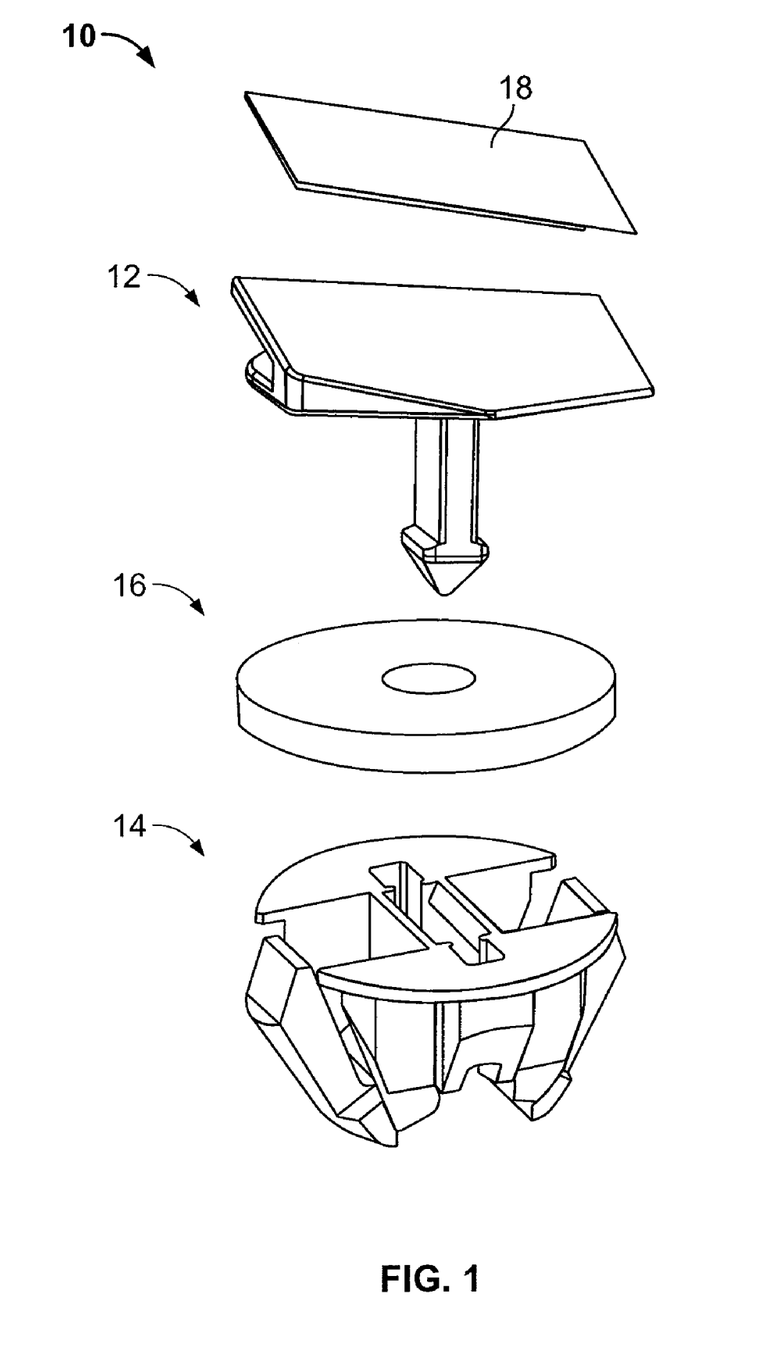
FIG. 1 illustrates an isometric exploded view of a fastener assembly according to an embodiment of the present invention.

FIG. 1 illustrates an isometric exploded view of a fastener assembly 10 according to an embodiment of the present invention. The fastener assembly 10 includes a pin 12 configured to be adjustably secured to a grommet 14. The fastener assembly 10 may also include a circular seal 16 sandwiched between the pin 12 and the grommet 14 and adhesive tape 18 secured to a top portion of the pin 12.

The tape 18 is configured to adhesively secure the pin 12 to a panel, such as a B-pillar appliqué. Optionally, the pin 12 may secure to a panel through various other fastening techniques. For example, the pin 12 may be configured to snapably secure within a hole of a panel.

The grommet 14 is configured to adjustably retain the pin 12. The grommet is also configured to snapably secure within a hole formed through another panel. As such, the pin 12 secures to a first panel, while the grommet secures to a second panel. Because the pin 12 is configured to be adjustably secured within the grommet 14, the fastener assembly 10 securely fastens the first panel to the second panel.

Figure 2:
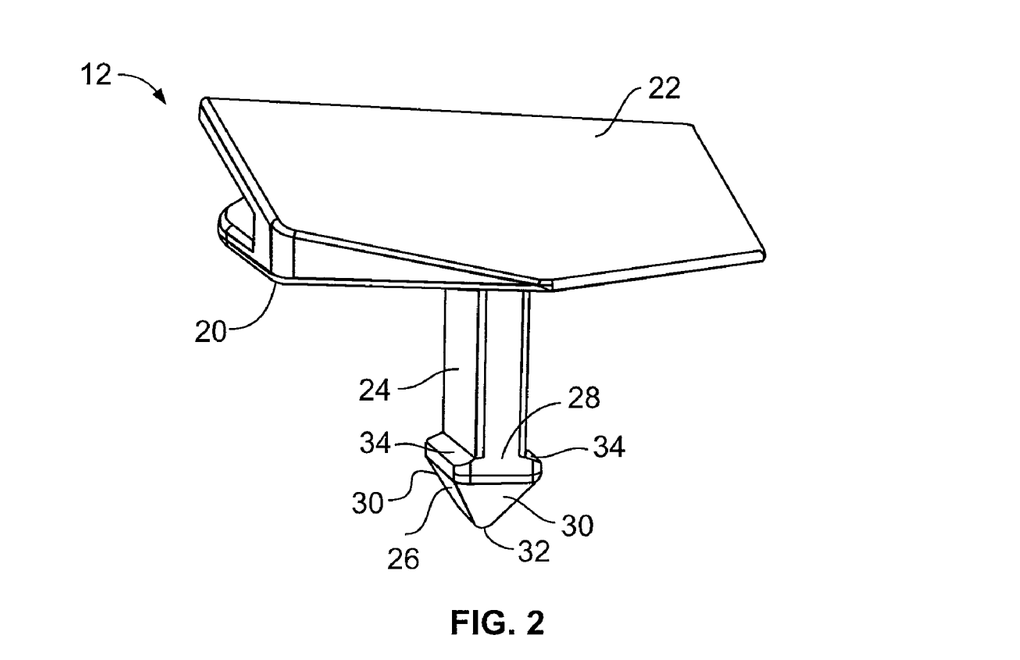
FIG. 2 illustrates an isometric view of a pin from a first side according to an embodiment of the present invention.
Figure 3:
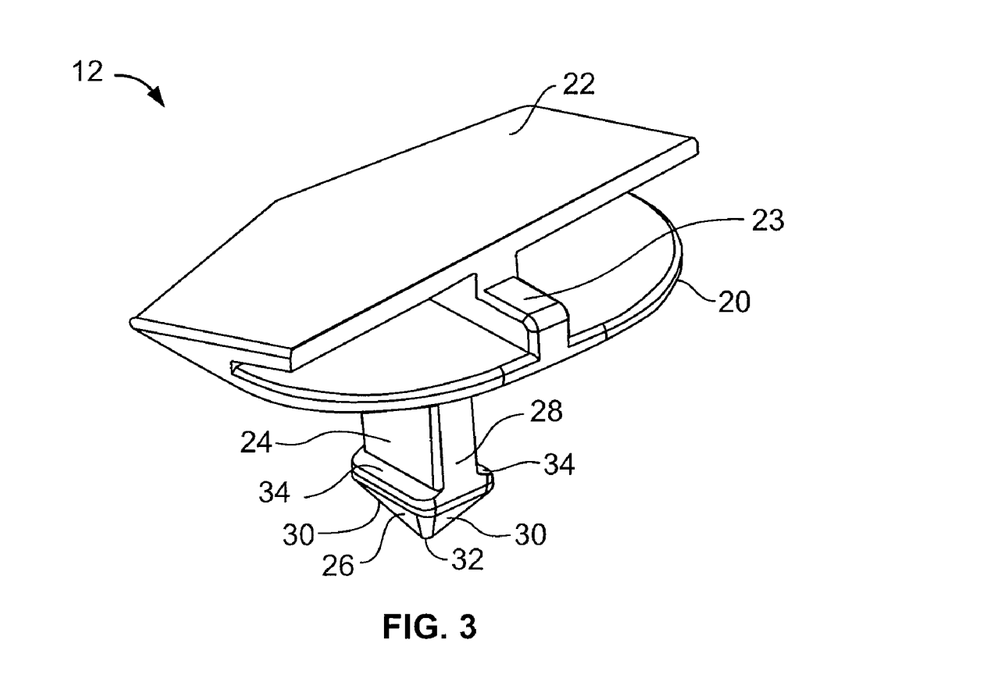
FIG. 3 illustrates an isometric view of a pin from a second side according to an embodiment of the present invention.

FIGS. 2 and 3 illustrate isometric views of the pin 12 from first and second sides, respectively. Referring to FIGS. 2 and 3, the pin 12 includes a collar 20 that supports an angled mounting surface 22 by way of central wedge 23 that integrally connects the collar 20 to the mounting surface 22. The tape 18, shown in FIG. 1, is secured to the mounting surface 22. While the mounting surface 22 is angled with respect to the collar 20, the mounting surface 22 may alternatively be parallel with the collar 20, depending on a specific application. Also, optionally, the pin 12 may not even include the angled mounting surface 22 positioned above the collar 20. Instead, the collar 20 itself may serve as the mounting surface.

A central post or shaft 24 downwardly extends from the collar 20. An expanded tip 26 is integrally connected to, and extends from, an end 28 of the shaft 24. The tip 26 includes inwardly angled surfaces 30 that converge at an apex 32. The tip 26 resembles a pyramid shape, but may be various other shapes having a beveled surface or other such surfaces that converge at an apex or point. The tip 26 also includes ledges 34 that are distally located from the apex 32. The ledges 34 integrally connect to opposite sides of the shaft 24. The ledges 34 are configured to securely latch or hook onto a reciprocal structure of the grommet 14 (shown in FIG. 1), as further discussed below.

Figure 4:
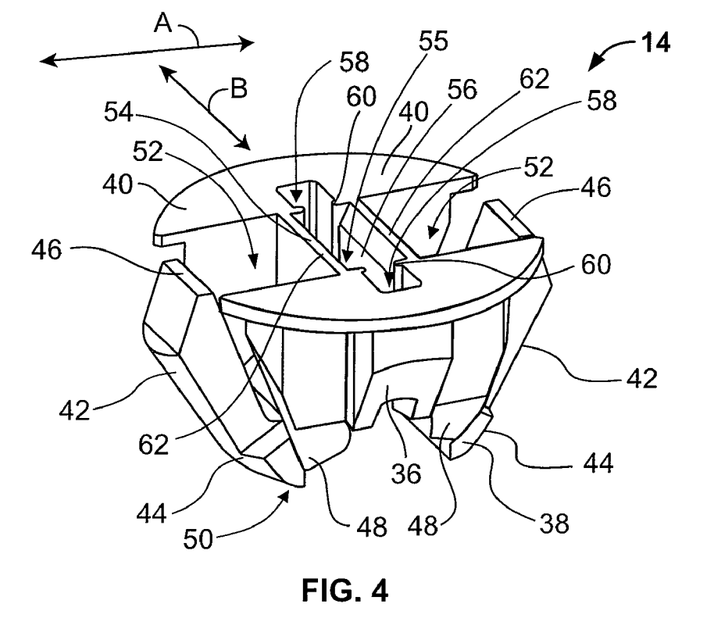
FIG. 4 illustrates a top isometric view of a grommet according to an embodiment of the present invention.

FIG. 4 illustrates a top isometric view of the grommet 14. The grommet 14 includes a W-shaped base 36 having walls 38 integrally connected to a pin support base 40. Flexible, opposing wings 42 are positioned on opposite sides of the base 36 and connect to the walls 38 at lower portions 44. Upper portions 46 of the wings 42 are detached from the base 36 and are configured to inwardly flex to allow the grommet 14 to pass into a hole formed within a panel. As shown in FIG. 4, the lower portions 44 of the wings 42 and lower portions 48 of the walls 38 are beveled and inwardly angle toward a center of the grommet 14. The inwardly-angled nature of the lower portions 44 of the wings 42 and the lower portions 48 of the walls 38 form a lead-in nose 50 that is configured to allow an operator to easily locate a hole within a panel. That is, the beveled nature of the lead-in nose 50 sinks into a hole as the grommet slides over the hole.

Clearance areas 52 are formed between wings 42 and a central wall 54 that connects the walls 38 together. The clearance areas 52 allow the wings 42 to flex toward the central wall 54.

A central passage 55, or window, passes through the central wall 54 from the pin support base 40 all the way through the grommet 14. The central passage 55 includes a main opening 56 connected to end openings 58. Opposing bumps or ribs 60 extend into the central passage 54 and are located where the main opening 56 connects to the end openings 58. The ribs 60 may extend into the central passage 55 over the length of the central passage 55. The central wall 54 provides retaining ledges 62 on either side of the central passage 55. The retaining ledges 62 engage the ledges 34 of the tip 30 (shown in FIGS. 1-3) of the pin 12 in order to adjustably secure the pin 12 within the grommet 14.

The central passage 55 is configured to securely retain the shaft 24 (shown in FIGS. 2 and 3) of the pin 12 (shown in FIGS. 1-3) in the direction of arrows A. That is, the shaft 24 is prevented from shifting or otherwise moving in the direction of arrows A. The central passage 54 is also configured, however, to allow the shaft 24 to shift or adjust in the direction of arrows B. The opposing ribs 60 act as barriers that halt the movement of the shaft 24 in the direction of arrows B. Increased force in the direction of arrows B may be exerted into the pin 12, however, to overcome the halting force of the ribs 60 so that the shaft 24 may pass into the end openings 58. Additionally, the ribs 60 ensure that the pin 12 is properly located with respect to the grommet 14 during shipment and initial attachment of the fastener assembly 10 to a panel. That is, the two sets of opposing ribs 60 may be spaced apart from each other a specified distance that ensures proper alignment of the pin 12 with respect to the grommet 14.

Each set of opposing ribs 60 may be spaced from one another depending on a desired amount of "float" of the shaft 24 of the pin 12 through the central passage 55. Alternatively, the grommet 14 may not include any ribs 60 extending into the central passage 55.

Figure 5:
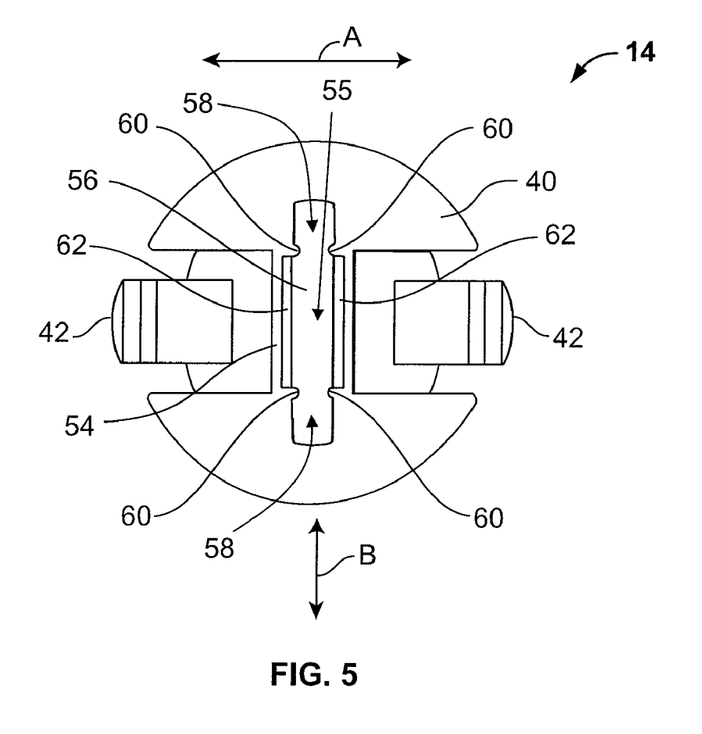
FIG. 5 illustrates a top plan view of a grommet according to an embodiment of the present invention.

FIG. 5 illustrates a top plan view of the grommet 14. Once the pin 12 (shown, e.g., in FIGS. 1-3) is positioned so that the shaft 24 is adjustably retained within the central passage 55, the shaft 24 may be moved in the direction of arrows B. The ledges 34 (shown in FIGS. 2 and 3) slide over the ledges 62 in the direction of arrows B. The central wall 54 that defines the central passage 55 prevents the shaft 24 from moving in the direction of arrows A, which, as shown, may be perpendicular to the direction of arrows B.

As noted above, the ribs 60 block movement of the shaft 24 into the end openings 58 unless a user manipulates the pin 12 and exerts increased force in the direction of arrows B. That is, the ribs 60 are configured to block movement of the shaft 24 when a user is not grasping or otherwise directly manipulating the pin 12 in the direction of arrows A. However, if a user desires to adjust the pin 12 past the ribs 60, the user may push or pull the pin 12 past the ribs 60 into the end openings 58.

Figure 6:
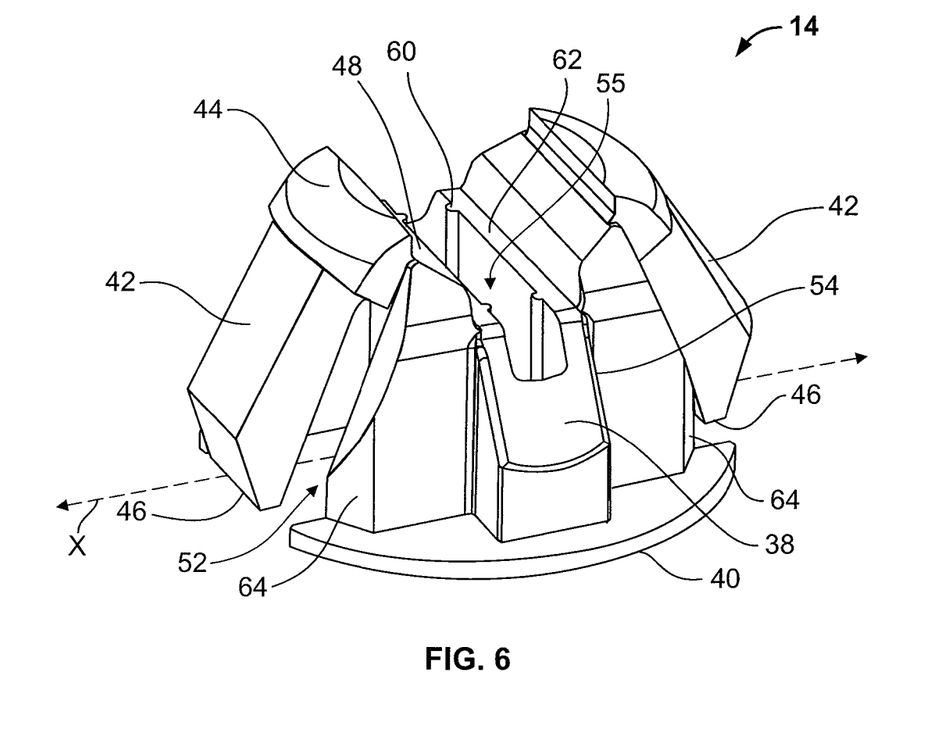
FIG. 6 illustrates a bottom isometric view of a grommet according to an embodiment of the present invention.

FIG. 6 illustrates a bottom isometric view of the grommet 14. The walls 38 also include outer locator ribs, nubs, or other such protuberances 64 proximate an underside of the pin support base 40. As shown in FIG. 6, each wall 38 includes a locator protuberance 64 distally located from the central wall 54. When inserted into a hole of a panel, the inwardly-canted locator protuberances 64 may bend or fold toward a horizontal axis x of the grommet 14 into the clearance areas 52. As such, the locator protuberances 64 may provide a barrier past which the wings 42 cannot pass, or at least hinder full flexing movement of the wings 42, thereby preventing the wings 42 from over-collapsing toward the central wall 54. Because the locator protuberances are inwardly-canted and beveled, the locator protuberances 64 also act to assist in properly locating and aligning the grommet 14 within a hole of a panel.

Figure 7:
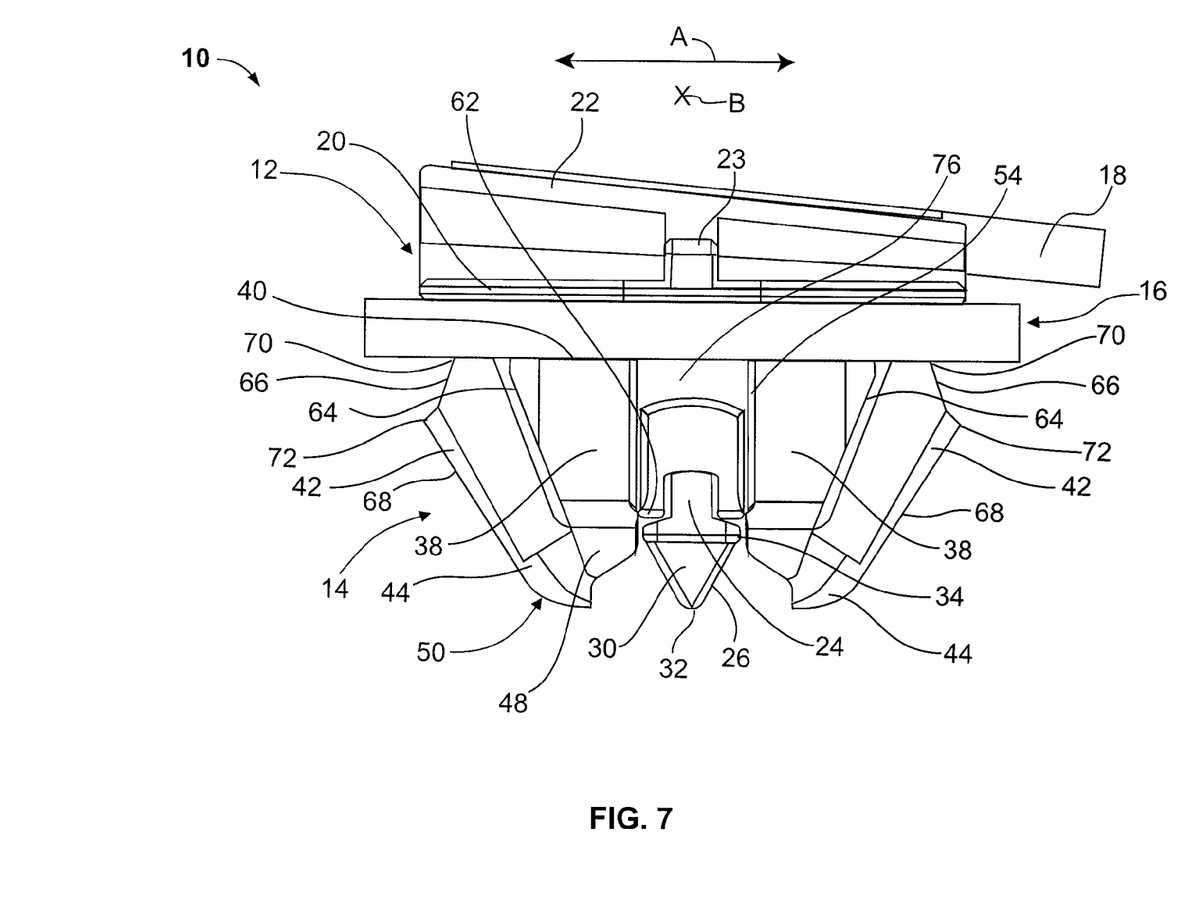
FIG. 7 illustrates a lateral view of a fastener assembly according to an embodiment of the present invention.

FIG. 7 illustrates a lateral view of the fastener assembly 10 according to an embodiment of the present invention. As shown in FIG. 7, the fastener assembly 10 is fully assembled such that the pin 12 is adjustably secured to the grommet 14. The tape 18 is secured onto the mounting surface 22 of the pin 12 such that an adhesive layer is exposed in order to adhesively secure to a panel. The seal 16 is sandwiched between the collar 20 of the pin 12 and the pin support base 40 of the grommet 14. The seal 16 is configured to prevent moisture, dirt and other such contaminants from infiltrating the fastener assembly 10. Moreover, the seal 16 may be formed of an elastomeric material that may also serve to dampen vibrations. The lead-in nose 50 defined by the inwardly beveled lower portions 44 and 48 of the wings 42 and walls 38, respectively, allows the grommet 14 to sink into a hole formed in a panel.

Figure 8:
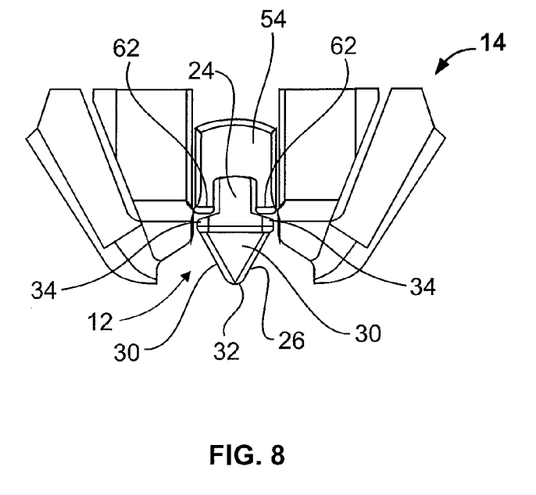
FIG. 8 illustrates a lateral close-up view of a pin secured to a grommet according to an embodiment of the present invention.

FIG. 8 illustrates a lateral close-up view of the pin 12 secured to the grommet 14. Referring to FIGS. 1-8, when the pin 12 is mated into the grommet 14, the tip 26 forces the central passage 55 open as it passes therethrough. Once the ledges 34 encounter the ledges 62 of the grommet 14, the window contracts back to its original shape as the ledges 34 snapably engage the ledges 62.

Referring to FIGS. 1-7, as the grommet 14 is urged into a hole of a panel, the wings 42 flex toward one another, pivoting about the union of the lower portions 44 and the lower portions 48 of the walls 38, as they pass into the hole. As shown in FIG. 7, for example, upper portions 66 of the wings 42 inwardly cant away from main beams 68 of the wings 42. The axial cross-section of the grommet 14 proximate the union of the main beams 68 and the upper portions 66 is greater than the axial cross-section of the grommet 14 proximate the distal ends 70 of the upper portions 70. Thus, as the grommet 14 is urged into the hole, the main beams 68 slide over edges of the panel that define the hole. With increased movement into the hole, the wings 42 flex toward one another. As the grommet 14 continues to slide into the hole, the edges of the panel encounter the reduced axial cross-section defined by the upper portions 66. As such, the wings 42 may retract somewhat. Nevertheless, when the grommet 14 is secured to a panel, the wings 42 are contracted toward one another (as compared to the wings 42 in their at-rest positions). In this position, the wings 42 may abut into the inwardly-folded locator protuberances 64 that extend into the clearance areas 52. As such, the wings 42 ensure that the central passage 55 (shown in FIGS. 4-6) does not bow or otherwise expand in the direction of arrows A, thereby ensuring that the shaft 24 is secured from movement in the direction of arrows A. Because the shaft 24 is trapped within the central passage 55 with respect to the direction of arrows A, the pin 12 is prevented from disengaging from the grommet 14. Thus, a solid locking system is formed between the pin 12 and the grommet 14 with respect to the direction of arrows A.

As noted above, the locator protuberances 64 may prevent the wings 42 from over-collapsing into the central wall 54 of the grommet 14. Additionally, the locator protuberances 64 act to properly align and position the grommet 14 within the hole of the panel due to the beveled shape of the locator protuberances 64.

Safety latches 72 are formed at the unions of the main beams 68 and the upper portions 66. Each safety latch 72 may be set at an angle that is perpendicular or oblique to the planes of corresponding upper portions 66 and main beams 68. The safety latches 72 ensure that once the grommet 14 is secured into a hole of a panel, the panel does not retreat back over the main beams 68. That is, the safety latches 72 prevent the panel from moving out of secure engagement with respect to the wings 42.

Upper portions 76 of the walls 38 (at outer surfaces of ends of the central wall 54) are also beveled and configured to slide into the hole of the panel. The upper portions 76 are inwardly canted and beveled similar to the upper portions 66 of the wings 42. The walls 38 may also include safety latches at lower ends of the walls 38. However, as shown, the walls 38 do not include safety latches. In general, the length between the safety latches 72 of the wings 42 is greater than the length of the central wall 54. When the wings 42 inwardly flex, the distance between opposing wings 42 may approach the length of the central wall 54 in order to allow the grommet 14 to pass into the hole of the panel. As discussed above, the wings 42 eventually at least partially retract to secure the grommet 14 into the hole of the panel.

Figure 9:
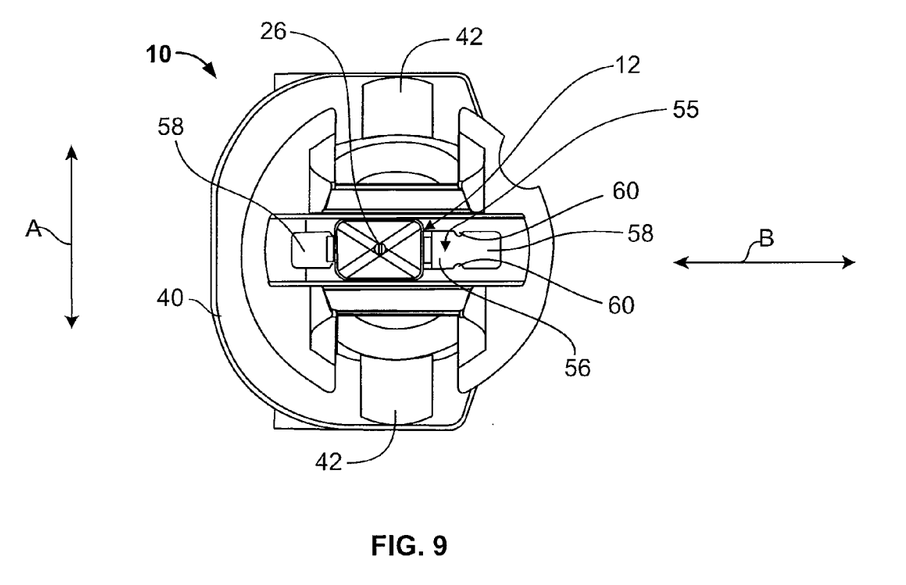
FIG. 9 illustrates a bottom plan view of a pin adjustably secured within the grommet according to an embodiment of the present invention.

FIG. 9 illustrates a bottom plan view of the pin 12 adjustably secured within the grommet 14. The pin 12 may shift with respect to the grommet 14 in the direction of arrows B, but is secured from movement with respect to the direction denoted by arrows B. The shaft 24 of the pin 12 is blocked from movement by opposing ribs 60 (hidden from view by the tip 26). The shaft 24 may freely slide through the main opening 56 from one set of opposing ribs 60 to the other set of opposing ribs 60. The distance between the sets of ribs 60 is configured to prevent the pin 12 from floating too much. For example, if the pin 12 floats too much with respect to the grommet 14 in the direction of arrows B, the lead-in nose 50 may not find the hole in a panel. The ribs 60 prevent the pin 12 from floating too much. In order to position the shaft 24 within the end openings 58, an increased amount of force is exerted into the pin 12 in the direction of arrows A, thereby moving the ribs 60 apart so that the shaft 24 may pass therebetween.

The pin 12 is adjustable to facilitate easier connection of one panel to another. As noted above, the pin 12 is secured to a first panel, while the grommet 14 is secured to another panel. However, when the panels are connected to one another through the fastener assembly 10, the panels may be slightly misaligned. The pin 12 may shift with respect to the grommet 14, as discussed above, to ensure that the panels are properly aligned with one another, which is in stark contrast to conventional pin and grommet fasteners in which separate and distinct adjusting devices or components are formed with respect to the panels.

Figure 10:
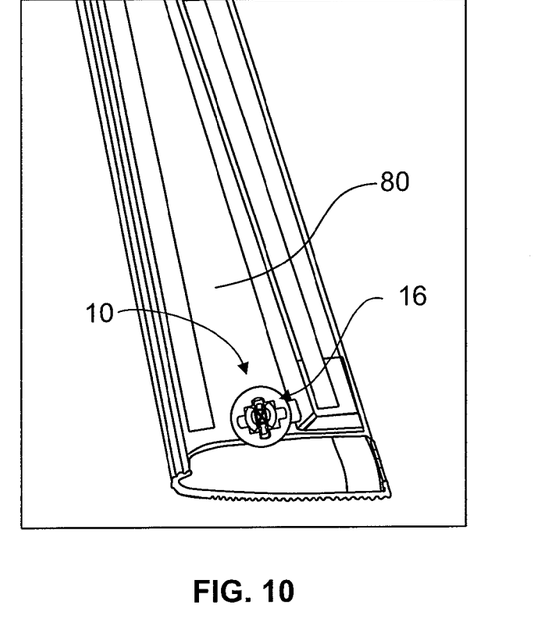
FIG. 10 illustrates a bottom plan view of a fastener assembly secured to a B-pillar appliqué according to an embodiment of the present invention.
Figure 11:
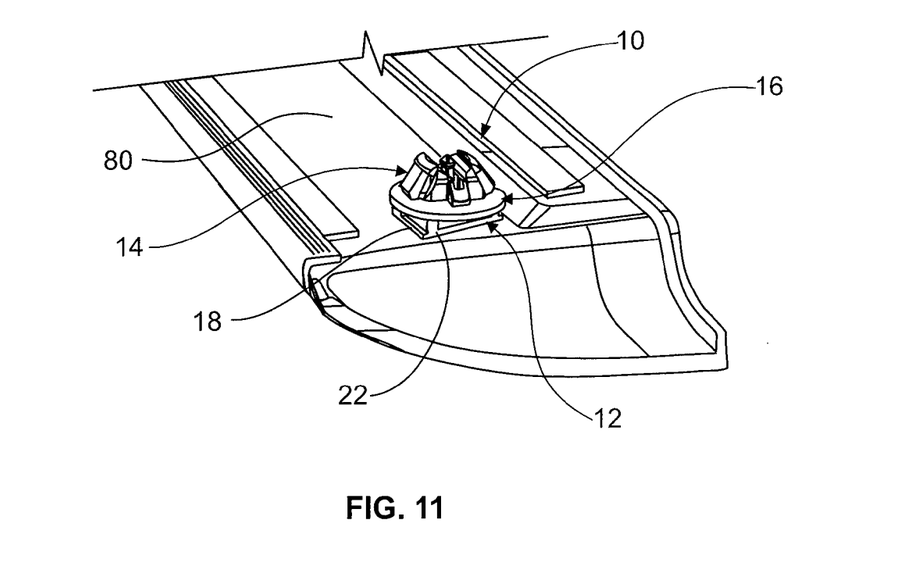
FIG. 11 illustrates a bottom isometric view of a fastener assembly secured to a B-pillar appliqué according to an embodiment of the present invention.

FIG. 10 illustrates a bottom plan view of the fastener assembly 10 secured to a panel 80, such as a B-pillar appliqué, according to an embodiment of the present invention. FIG. 11 illustrates a bottom isometric view of the fastener assembly 10 secured to the panel 80. Referring to FIGS. 10 and 11, the mounting surface 22 of the pin 12 is secured to the panel 80 through the adhesive tape 18. Once the fastener assembly 10 is secured to the panel 80, the grommet 14 may be secured to another panel, such as a door frame.

Figure 12:
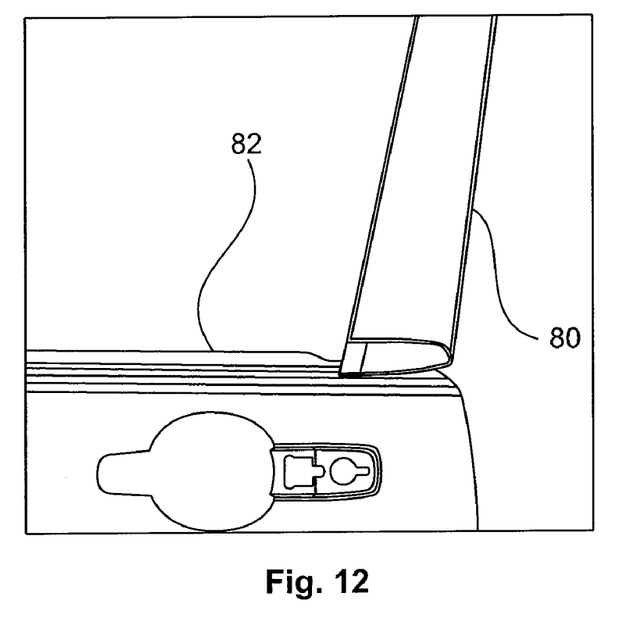
FIG. 12 illustrates a top plan view of a B-pillar appliqué secured to a door panel according to an embodiment of the present invention.
Figure 13:
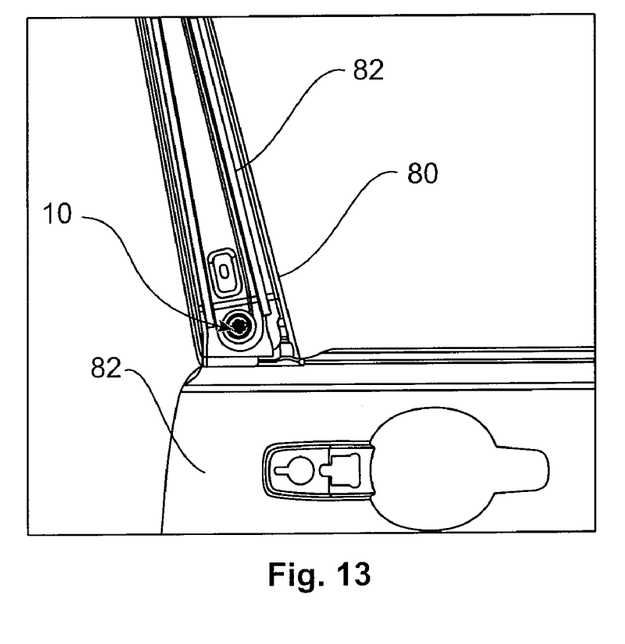
FIG. 13 illustrates a bottom plan view of a B-pillar appliqué secured to a door panel according to an embodiment of the present invention.

FIGS. 12 and 13 illustrate top and bottom plan views, respectively, of the panel 80, such as a B-pillar appliqué, secured to another panel 82, such as a vehicle door panel according to an embodiment of the present invention. The fastener assembly 10 securely fastens the panel 80 to the panel 82.

Figure 14:
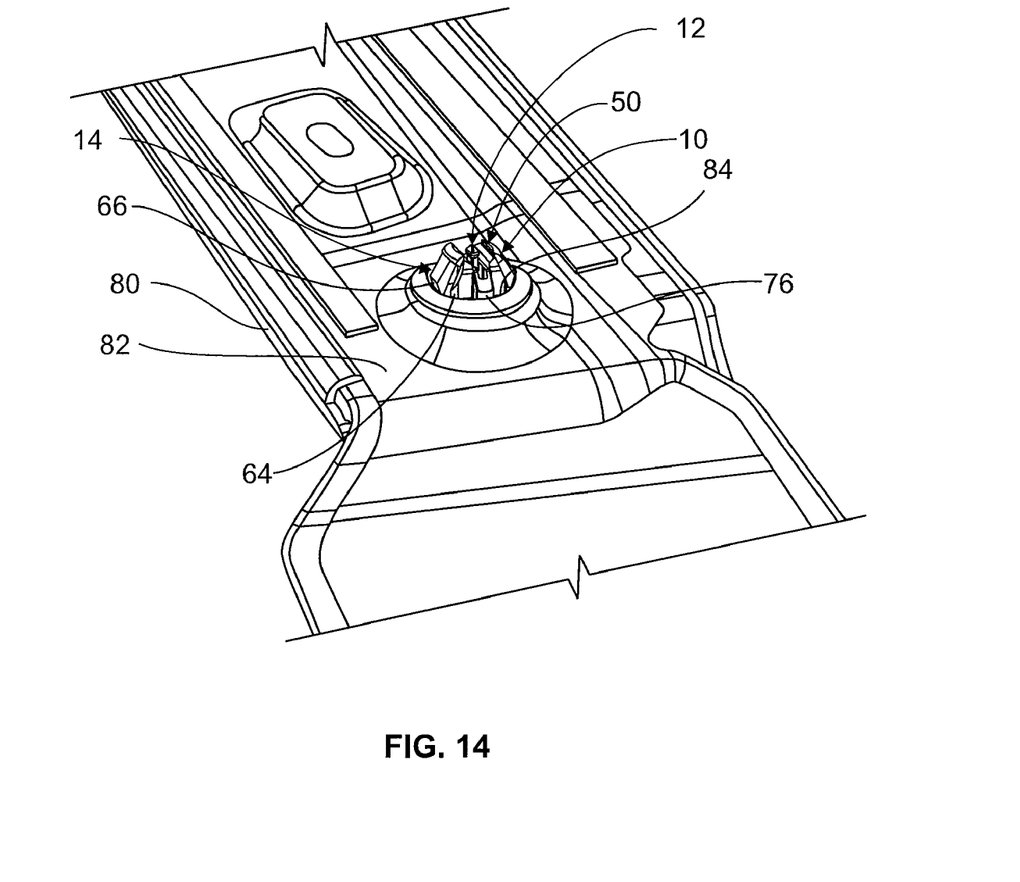
FIG. 14 illustrates a bottom isometric view of a B-pillar appliqué secured to a door panel according to an embodiment of the present invention.

FIG. 14 illustrates a bottom isometric view of the panel 80, such as a B-pillar appliqué, secured to the panel 82, such as a door panel. The panel 82 includes a hole 84 formed through a portion thereof. The grommet 14 of the fastener assembly 10 snapably secures into the hole 84, as discussed above. The upper angled portions 66, 76 and locator protuberances 64 of the grommet 14 cooperate to ensure proper alignment of the grommet 14 within the hole 84.

When the panel 80 is being secured to the panel 82, the lead-in nose 50 sinks into the hole 84 as the lead-in nose 50 encounters the hole 84. The pin 12 may shift within the grommet 14, as discussed above, to allow for proper alignment of the panel 80 with respect to the panel 82. The pin 12 floats relative to the grommet 14 in the direction of arrows B in order to allow the lead-in nose 50 of the grommet 14 to find the hole 84 of the panel 82 during assembly. Further, the floating nature of the pin 12 in the grommet 14 in the direction of arrows B allows build variation of hole-to-hole tolerance in sheet metal, as well as clip-to-clip location on molding.

In general, the ability of the pin 12 to float in the direction of arrows B over a specified distance (e.g., the distance between the two sets of ribs 60) allows the panels 80, 82 to be adjusted with respect to one another after the grommet 14 is secured to the panel 82. Such a configuration differs from typical pin and grommet fasteners in that it does not require an adjustable feature on the molding or a slot in the sheet metal in order to adjust the pin with respect to the grommet.

While the fastener assembly 10 is described as allowing the pin 12 to shift in the direction of arrows B, but not arrows A, the central passage 55 of the grommet 14 may be configured to allow for a controlled float in other directions. For example, the central passage may be cross-shaped in order to allow the pin 12 to float in the direction of arrows A and arrows B, thereby providing a four way locator. Additionally, the central passage 55 may be shaped as a circle having a greater diameter than the shaft 24, but not the portion of the tip 26 that integrally connects to the shaft 24 (e.g., the ledges 34). As such, the pin 12 may float through a 360° range of motion.

Thus, embodiments of the present invention provide a fastener assembly that includes a pin that may be adjusted with respect to a grommet. As such, the process of securing two panels together is made easier due to the fact that the pin may be shifted with respect to the grommet based on the positions of the panels with respect to one another. Further, unlike conventional pin and grommet fasteners, embodiments of the present invention include simple and efficient integrally formed feature that allows for the pin to be adjustably secured with respect to the grommet.

While various spatial terms, such as upper, lower, mid, lateral, horizontal, vertical, and the like may used to describe portions of the embodiments discussed above, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener assembly configured to secure a first panel to a second panel, the fastener assembly comprising:
    a pin comprising a shaft connected to a tip, said shaft including an axis extending therethrough; and
    a grommet configured to snapably secure into a hole of the first panel, said grommet comprising a central passage, said shaft being adjustably secured within said central passage, wherein said shaft is allowed to shift a fixed distance within said central passage in a first direction that is perpendicular to said axis, wherein said shaft is locked in place in said central passage with respect to a second direction that is perpendicular to said first direction and said axis, wherein said grommet further comprises opposing flexible wings, said opposing flexible wings flexing toward one another when said grommet is snapably secured into the hole of the first panel, wherein said opposing flexible wings prevent said central passage from expanding in the second direction when said grommet is snapably secured into the hole of the first panel, wherein said grommet further comprises locating protuberances that are configured to locate and align said grommet with respect to the hole of the first panel, and wherein said locating protuberances provide barriers that prevent said opposing flexible wings from over-flexing.

2. The fastener assembly of claim 1, wherein said grommet further comprises at least one set of opposing ribs extending into said central passage, said at least one set of opposing ribs being configured to block movement of said shaft.

3. A fastener assembly configured to secure a first panel to a second panel, the fastener assembly comprising:
    a pin comprising a shaft connected to a tip, said shaft including an axis extending therethrough; and
    a grommet configured to snapably secure into a hole of the first panel, said grommet comprising a central passage, said shaft being adjustably secured within said central passage, wherein said shaft is allowed to shift a fixed distance within said central passage in a first direction that is perpendicular to said axis, wherein said shaft is locked in place in said central passage with respect to a second direction that is perpendicular to said first direction and said axis, wherein said tip further comprises first ledges and wherein said grommet further comprises second ledges bounding said central passage, said first ledges being slidably secured on said second ledges.

4. A fastener assembly configured to secure a first panel to a second panel, the fastener assembly comprising:
- a pin comprising a shaft connected to a tip, said shaft including an axis extending therethrough, wherein said pin further comprises a mounting member secured to said shaft, wherein said mounting member is distally located with respect to said tip, said mounting member being configured to secure to the second panel;
- a grommet configured to snapably secure into a hole of the first panel, said grommet comprising a central passage, said shaft being adjustably secured within said central passage, wherein said shaft is allowed to shift a fixed distance within said central passage in a first direction that is perpendicular to said axis, wherein said shaft is locked in place in said central passage with respect to a second direction that is perpendicular to said first direction and said axis, and
- a seal sandwiched between a portion of said mounting member and a portion of said grommet.

5. A fastener assembly configured to secure a first panel to a second panel, the fastener assembly comprising:
- a pin comprising a mounting member connected to a shaft, which is in turn connected to an expanded tip, said mounting member configured to secure to the first panel; and
- a W-shaped grommet configured to snapably secure into a hole of the second panel, said grommet comprising walls connected to opposing flexible wings, wherein a central passage is formed through said grommet, said shaft being adjustably secured within said central passage, wherein said shaft is allowed to shift within said central passage, and wherein said grommet further comprises at least one set of opposing ribs extending into said central passage, said at least one set of opposing ribs being configured to block movement of said shaft.

6. The fastener assembly of claim 5, wherein said shaft is allowed to shift a fixed distance in a first direction within said central passage, and wherein said shaft is locked in place in said central passage with respect to a second direction that is perpendicular to said first direction.

7. The fastener assembly of claim 5, wherein said mounting member comprises a collar connected to said shaft and an angled mounting surface connected to said collar through a wedge.

8. The fastener assembly of claim 5, wherein said opposing flexible wings flex toward one another when said grommet is snapably secured into the hole of the second panel, wherein said opposing flexible wings prevent said central passage from outwardly bowing when said grommet is snapably secured into the hole of the second panel.

9. The fastener assembly of claim 8, wherein said grommet further comprises locating protuberances that are configured to locate and align said grommet with respect to the hole of the second panel, and wherein said locating protuberances provide barriers that prevent said opposing flexible wings from over-flexing.

10. The fastener assembly of claim 5, wherein said expanded tip further comprises first ledges and wherein said grommet further comprises second ledges bounding said central passage, said first ledges being slidably secured on said second ledges.

11. The fastener assembly of claim 5, further comprising a seal sandwiched between a portion of said mounting member and a portion of said grommet.

12. A fastener assembly configured to secure a first panel to a second panel, the fastener assembly comprising:
- a pin comprising a mounting member connected to a shaft, which is in turn connected to an expanded tip, said mounting member configured to secure to the first panel through an adhesive, said mounting member comprising a collar connected to said shaft and an angled mounting surface connected to said collar through a wedge; and
- a W-shaped grommet configured to snapably secure into a hole of the second panel, said grommet comprising walls connected to opposing flexible wings, wherein a central passage is formed through said grommet, and two sets of opposing ribs extending into said central passage, said shaft being adjustably secured within said central passage, wherein said shaft is allowed to shift within said central passage in a first direction, and wherein said shaft is locked in place in said central passage with respect to a second direction that is perpendicular to said first direction, said two sets of opposing ribs limiting movement of said shaft within said central passage, wherein said pin may be manipulated to force said shaft past a particular set of said two sets of opposing ribs.

13. The fastener assembly of claim 12, wherein said opposing flexible wings flex toward one another when said grommet is snapably secured into the hole of the second panel, wherein said opposing flexible wings prevent said central passage from outwardly bowing when said grommet is snapably secured into the hole of the second panel.

14. The fastener assembly of claim 13, wherein said grommet further comprises locating protuberances that are configured to locate and align said grommet with respect to the hole of the second panel, and wherein said locating protuberances provide barriers that prevent said opposing flexible wings from over-flexing.

15. The fastener assembly of claim 12, wherein said expanded tip further comprises first ledges and wherein said grommet further comprises second ledges bounding said central passage, said first ledges being slidably secured on said second ledges.

16. The fastener assembly of claim 12, further comprising a seal sandwiched between a portion of said mounting base and a portion of said grommet.

* * * * *